March 18, 1952      W. E. FRYE      2,589,240
DOUBLE PULSE GENERATOR
Filed April 7, 1945      2 SHEETS—SHEET 1
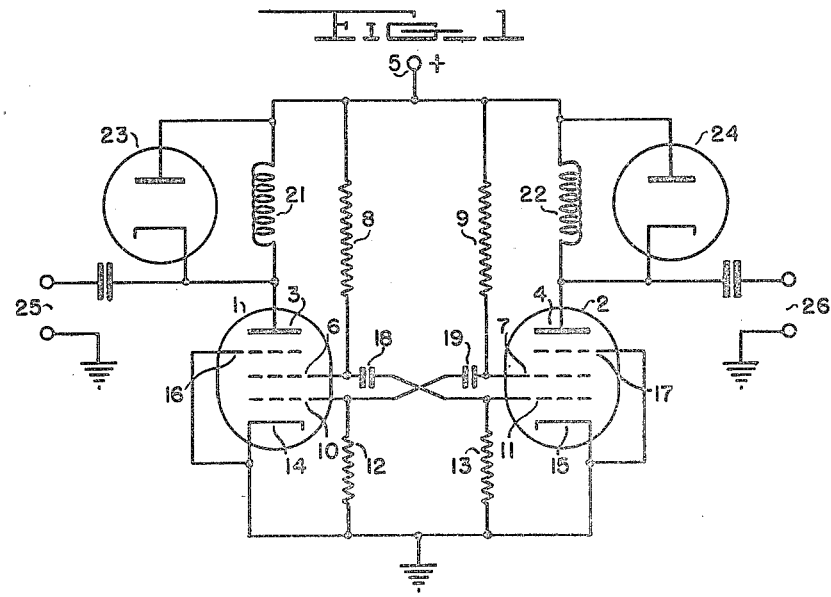
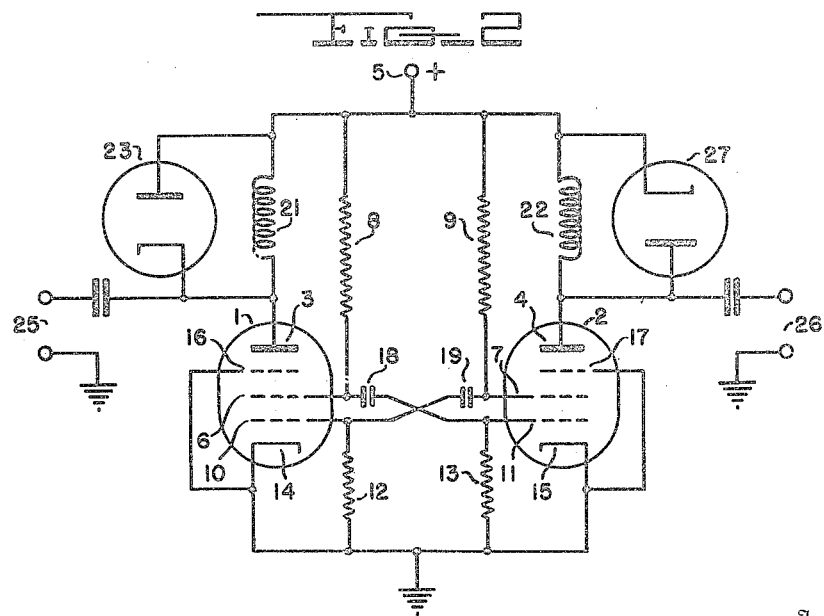
Inventor
WILLIAM E. FRYE
By Ralph L. Chappell
Attorney

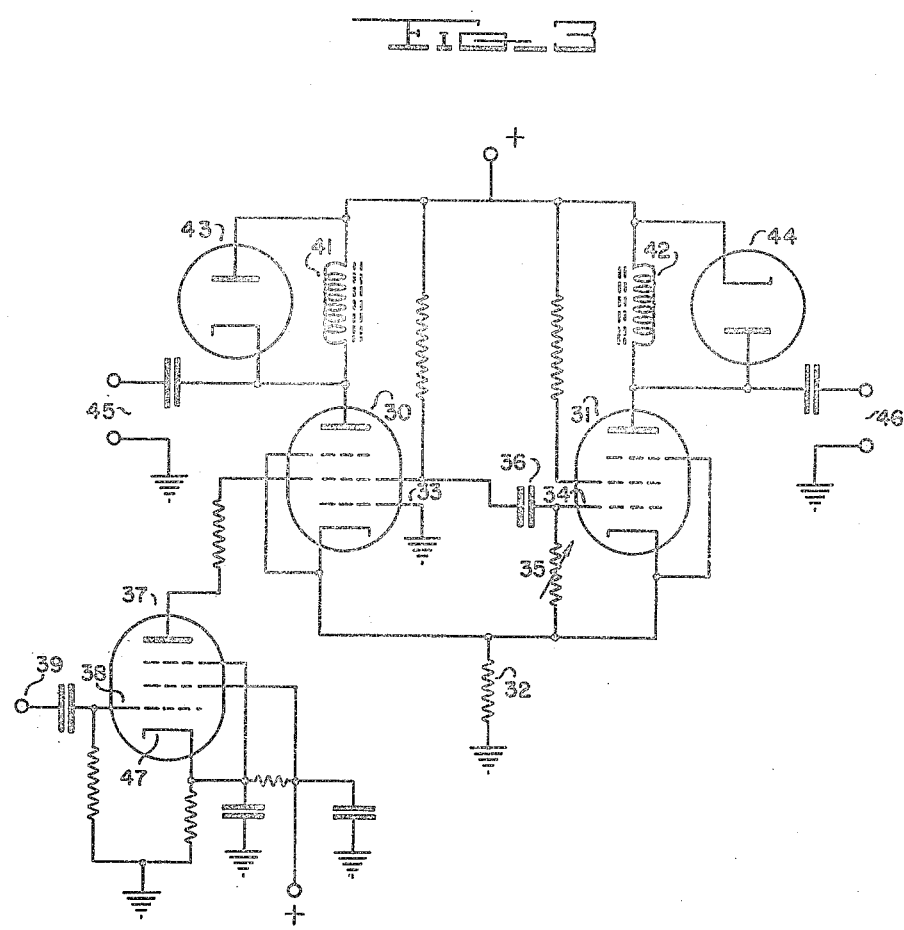

Patented Mar. 18, 1952

2,589,240

UNITED STATES PATENT OFFICE 2,589,240

DOUBLE PULSE GENERATOR

William E. Frye, Washington, D. C.

Application April 7, 1945, Serial No. 587,198

5 Claims. (Cl. 250—36)

(Granted under the act of March 3, 1883, as amended April 30, 1928; 370 O. G. 757)

This invention is directed to the problem of voltage generation and is particularly related to the generation of voltages for the use with cathode ray oscilloscope sweep circuits and with triggering circuits.

The invention also has ultility in the generation of voltage signals used for keying various apparatus.

The invention will be further described with reference to the drawings in which:

Figure 1 shows an exemplary embodiment of the invention;

Figure 2 shows a second embodiment thereof; and

Figure 3 shows a generator responsive to an external signal.

The circuit of Figure 1 is of the multivibrator type generator in which keying voltages are generated through the shock excitations of resonant circuit components integrally associated therewith. The circuit includes two tubes 1 and 2, whose anodes 3 and 4 are energized from positive potential source 5. Each tube includes an inner and an outer grid, in which the inner grid, controlling the space current through the tube, thereby controls the current drawn by the outer grid under a positive potential. In the embodiment of Figure 1, the inner and outer grids are adjacent, there being no intervening grids. Tubes 1 and 2 are conventional pentodes, in which the control grid is employed as the inner grid, and the screen grid as the outer grid. The screen grids 6 and 7 are energized from positive potential source 5 through series dropping resistors 8 and 9. The control grids 10 and 11 are returned to ground through series resistors 12 and 13. Cathodes 14 and 15 are also returned to ground. In the embodiment shown the tubes also include suppressor grids 16 and 17 which are directly connected to the cathodes.

In the circuit of Figure 1 tubes 1 and 2 are alternately conducting. This is achieved by connecting the tubes as a multivibrator, in which the screen grids 6 and 7 function as anodes of the multivibrator. For this purpose, coupling condensers 18 and 19 are provided each connecting the screen grid of one tube to the control grid of the opposite tube. The cycle of operations is controlled by the blocking time constants, the condenser 19 and resistor 12 determining the blocking time of tube 1 and condenser 18 together with resistor 13 determining the blocking time of tube 2.

The abrupt alternate shifts in plate current in the two tubes which is effected by the operation of the multivibrator circuit is employed to generate the desired voltage signals through shock excitation of circuit components in series with tubes. For this purpose, inductances 21 and 22 are inserted in the anode circuits of the tubes. These inductances constitute resonant circuits having a period determined by the natural frequency of the coil, which in turn is a function of the inductance and the distributed capacitance.

The output signals are taken off from the anodes of the tubes, terminals 25 providing the output of tube 1 and terminals 26 providing the output of tube 2. Through the operation of the resonant circuit it will be understood that a negative swing will accompany the action when a tube goes into conduction, and that a positive swing results from the cut-off of a tube. Through the shielding action of the screen grids, the anode voltage swing has no disturbing effect on the multivibrator circuit.

The operation of Figure 1 is designed to generate successive voltage signals of the same polarity. This is effected by shunting the resonant circuit components by unilateral impedances. In the embodiment shown these consist of diodes 23 and 24, connected to permit shock response for supplying positive output voltages. These signals are generated upon blocking action of either tube and the diodes function to eliminate the second half cycles generated in the resonant circuit so that only the positive half cycles are supplied at the output terminals. The voltage swing appearing on conduction of either tube is eliminated by the diodes in the circuit of Figure 1.

It will therefore be understood that normally the frequency of the multivibrator will be less than the natural frequency of the inductance shown or of the resonant frequency in case lumped parameters are employed.

Through suitable selections of the natural frequencies of the resonant components, control may be obtained of the pulse length supplied by the generator, as the pulse duration is half the natural period. In case the inductances are minimized and the shunting and distributed capacities are maintained at a low value, output pulses of the order of one microsecond may be obtained. These pulses will be supplied at twice the frequency of the multivibrator. The generator may be synchronized by an injected synchronizing signal applied to the multivibrator circuit components in any conventional fashion.

In synchronized operation, alternate output pulses will appear at a definite frequency. The time delay between the stabilized pulses and the alternate series of intervening pulses may be controlled through selection of the blocking time constant of the uncontrolled tube grid circuit.

It will be further understood that the flexibility of the present circuit permits individual control of the pulse duration time of each alternate series. Thus, for instance, the period of resonant circuit component 21 may be considerably longer or considerably shorter than that of resonant component 22. It is therefore apparent that, through the cricuit of the present invention, pulses of desired length appearing at desired intervals may be obtained from a single pair of tubes.

An exemplary circuit embodying this design is shown in Figure 2. This circuit is identical with that in Figure 1 with the exception that the unilateral impedance 27 is connected reversely with reference to diode 24 in Figure 1. When tube 1 of Figure 2 blocks and the tube 2 goes into conduction, a negative signal is supplied at terminal 26 and a positive signal at terminal 25. These signal voltages may be employed for the oscilloscopic examination of transient or recurrently synchronized phenomena. For this purpose, inductance 21 may be of very small period, of the order of one microsecond. Inductance 22, on the other hand, may have a period of the order of a millisecond. The multivibrator frequency may be of the order of 500 cycles. Operating under these conditions, a sharp positive pulse is supplied at terminals 25 and coincidentally therewith a negative half cycle is generated at terminals 26. The sharp positive pulse at terminals 25 may be employed as a keying voltage to initiate operation of whatever type of circuit is under examination. The sine wave voltage supplied at terminals 26 may be employed directly as a sweep voltage on the cathode ray tube itself. Normally only the initial portion of the long time constant impulse is used, since this section of the voltage supplied constitutes a nearly linear increasing potential.

The circuit of Figure 2 may also be applied to the generation of balanced sweep voltages of a cathode ray tube. For this purpose, both inductances 21 and 22 both have the same period which may be of a relatively long duration. While the multivibrator acts as explained above, across each inductance there is simultaneously initiated voltages of sine wave forms having opposite polarity. If the output terminals connected to the anodes of tubes 1 and 2 are in turn connected to a pair of electrostatic deflection plates, balanced voltage will be supplied which effect deflection of the cathode ray tube beam without defocusing the beam.

The circuit in Figure 3 discloses means other than the multivibrator for the purpose of effecting alternate tube conduction. The circuit shown constitutes a trigger circuit.

The circuit comprises pentode tubes 30 and 31 which are arranged so that tube 30 is normally biased to cutoff across common cathode resistor 32. For this purpose control grid 33 of tube 30 is returned directly to ground. Control grid 34 of tube 31 is returned to the positive end of resistor 32. The return of control grid 34 is through resistor 35, and this grid is coupled to the screen grid of tube 30 through blocking condenser 36. The components mentioned effectuate keying operation upon the injection of a negative signal on control grid 34 from keying tube 37. Tube 37 is normally held non-conductive by positive bias applied to cathode 47, and is put into conduction by a suitable positive signal applied to its control grid 38 from terminal 39. The resulting negative voltage which is applied to the screen grid of tube 30 is communicated through condenser 36 to control grid 34 whereby tube 31 is immediately biased off. As soon as the anode current falls in tube 31 sufficiently to lower the bias on resistor 32, tube 30 immediately goes into conduction.

The cut-off voltage on grid 34 of tube 31 is reinforced by conduction of tube 30 through the screen current drawn therein, where the screen is acting as the outer grid. Tube 31 remains blocked in accordance with the magnitude of the time constant of resistors 35 and 32, and condenser 36 in the circuit of control grid 34.

The anodes circuits of tubes 30 and 31 contain inductances 41 and 42 respectively. These inductances are shunted by diodes 43 and 44, which are inversely connected similarly to those in Figure 2. Due to this connection, upon tripping the circuit by operation of tube 37, no output signals are supplied since the diodes damp the resonant voltage swings. Upon relaxation of tube 31 following discharge of condenser 36, the tubes revert to their normal condition and it is at this point that output voltages are supplied. A positive half sine wave cycle or pulse is supplied at terminals 45 through the operation of tube 30 and a similar negative voltage signal is supplied at terminal 46 from tube 31. These voltages may be whatever duration desired, as explained above. In the circuit shown, however, relatively long period sinusoidal pulses are generated by the action of inductances 41 and 42 which as shown include a powdered iron core to increase their period.

It is therefore apparent that the invention provides means for generating balanced electrostatic deflection voltages for application to a cathode ray tube. These voltages are generated at any selectable time after the triggering impulse is supplied to tube 37. As mentioned, this period is determined by the time constant controlling the grid circuit of tube 31. Manifestly therefore a phenomenon may be initiated for the same pulse which is injected into tube 37 and the resulting condition may be examined on the oscilloscope by a sweep voltage which is initiated at any desired time thereafter.

Reverse connection of unilateral impedances 43 and 44 cause the circuit of Figure 3 to generate balanced sweep voltages directly upon introduction of the control signal in tube 37. For many purposes such a sweep generator is of high utility.

It will be understood that the above described embodiments of the invention are exemplary only.

The invention described herein may be manufactured and used by or for the Government of the United States of America for governmental purposes without the payment of any royalty thereon or therefor.

I claim:

1. A signal generating circuit comprising a pair of tubes each having two main space current electrodes and inner and outer grids, circuit means connecting said tubes in a multivibrator circuit wherein the outer grids act as anodes, a separate resonant circuit connected in main space current carrying relationship with one of said electrodes of each of said tubes operative to be shock excited on action of the multivibrator circuit, and unilateral impedances reversely connected across the resonant circuits whereby on multivibrator action each resonant circuit is shock excited to a single half cycle operation generating balanced voltages of opposite polarity.

2. A signal generating circuit comprising a pair of tubes each having two main space current electrodes and inner and outer grids, circuit means connecting said tubes in a multivibrator circuit wherein the outer grids act as anodes, a separate resonant circuit connected in main space current carrying relationship with one of said electrodes of each of said tubes operative to be shock excited on action of the multivibrator circuit, a unilateral impedance connected across each resonant circuit, one of said resonant circuits having a long period to generate a slowly changing voltage, and the other of said resonant circuits having a short period to generate a brief impulse.

3. A signal generating circuit comprising a pair of tubes each having two main space current electrodes and inner and outer grids, circuit means connecting said tubes in a multivibrator circuit wherein the outer grids act as anodes, a separate resonant circuit connected in main space current carrying relationship with one of said electrodes of each tube, operative to be shock excited on action of the multivibrator circuit, one of said resonant circuits being tuned to a substantially higher frequency than the other and unilateral impedances shunting each resonant circuit and acting to damp said resonant circuits to a substantially single half cycle oscillation.

4. A signal generating circuit comprising a pair of tubes each having two main space current carrying electrodes and inner and outer grids, circuit means connecting said tubes in a multivibrator circuit wherein the outer grids act as anodes, a separate resonant circuit connected in main space current carrying relationship with one of said electrodes of each of said tubes, operative to be shock excited on action of the multivibrator circuit, one of said resonant circuits being tuned to a substantially higher frequency than the other, and unilateral impedances reversely connected across the resonant circuits whereby on multivibrator action each resonant circuit is simultaneously shock excited to a single half cycle oscillation of opposite polarity.

5. A signal generating circuit comprising a pair of tubes having two main space current electrodes and inner and outer grids, circuit means connecting the inner grid of each tube to the outer grid of the other tube to form a multivibrator circuit wherein the outer grids act as anodes, resonant circuit means connected in main space current carrying relationship with one of said electrodes of at least one of said tubes, and unilateral impedance means shunting said resonant circuit means to damp the oscillations induced in said resonant circuit means by the multivibrator action.

WILLIAM E. FRYE.

REFERENCES CITED

The following references are of record in the file of this patent:

UNITED STATES PATENTS

| Number | Name | Date |
| --- | --- | --- |
| 1,993,783 | Heegner | Mar. 12, 1935 |
| 2,070,647 | Braaten | Feb. 16, 1937 |
| 2,132,654 | Smith | Oct. 11, 1938 |
| 2,159,792 | Geiger | May 23, 1939 |
| 2,182,555 | Geiger | Dec. 5, 1939 |
| 2,297,926 | Usselman | Oct. 6, 1942 |
| 2,408,061 | Grieg | Sept. 24, 1946 |
| 2,422,204 | Meacham | June 17, 1947 |
| 2,423,304 | Fitch | July 1, 1947 |
| 2,426,205 | Grieg et al. | Aug. 26, 1947 |
| 2,426,996 | Goodall | Sept. 9, 1947 |
| 2,441,963 | Gray | May 25, 1948 |
| 2,442,769 | Kenyon | June 8, 1948 |
| 2,443,619 | Hopper | June 22, 1948 |

FOREIGN PATENTS

| Number | Country | Date |
| --- | --- | --- |
| 485,934 | Great Britain | May 26, 1938 |